United States Patent Office 3,522,280
Patented July 28, 1970

3,522,280
HINDERED PHENOLS AND PROCESS OF
PRODUCING THE SAME
Hans-Dieter Becker, Schenectady, N.Y., assignor to General Electric Company, a corporation of New York
No Drawing. Filed Sept. 13, 1966, Ser. No. 578,993
Int. Cl. C09b 11/06
U.S. Cl. 260—395                         12 Claims

ABSTRACT OF THE DISCLOSURE

A selected group of weakly acidic CH-compounds react by a 1,6-addition process to 3,5-t-butylfuchsone to produce the corresponding 2,4,6-trisubstituted, hindered phenols which are new compositions. The hindered phenols are useful as anti-oxidants for petroleum products and as polymerization inhibitors for polymerizable monomers.

This invention relates to certain novel hindered phenols and a process of producing these materials. Organic substituent groups, which have large spatial bulk, i.e., have a three-dimensional structure approaching that of a sphere, when present as the substituent in at least one of the two ortho positions of a phenol, protect or block the phenolic hydroxyl group from entering into many of the chemical reactions which are possible for phenolic hydroxyl groups which are not so hindered. These phenols are known as hindered phenols, sometimes called crypto phenols. Those phenols containing a large bulky group in both ortho positions are highly hindered. Such hindered phenols have found wide use as antioxidants in, for example, gasoline, petroleum oils, plastic compositions, rubbers, etc. These so-called crypto phenols, especially those also having a substituent in the para position, as well as the two ortho positions are capable of being oxidized with oxidizing agents, such as peroxides, alkali potassium ferricyanide to produce stable or free radicals which have exceedingly long lifetimes. Such free radicals are useful in the promoting of chemical reactions requiring a source of free radicals. For many of these applications, both as antioxidants and as a source of free radicals, it is desirable that the substituent group in the para position be such that it will modify the solubility and compatability characteristics of the hindered phenol so that it can be readily incorporated into the composition in which it is to be used.

In my copending application Ser. No. 579,008, filed concurrently herewith, and assigned to the same assignee as the present invention, I have disclosed and claimed a novel chemical reaction for producing fuchsones by reacting a 2,6-disubstituted phenol with a benzophenone in a photo-chemical reaction wherein a solution of the phenol and benzophenone is irradiated with light having a wavelength in the region of from 300–500 m$\mu$ but not substantially below 300 m$\mu$. When the phenol is 2,6-di-t-butylphenol and the benzophenone is benzophenone itself, the fuchsone so produced is 3,5-di-t-butylfuchsone which has the formula

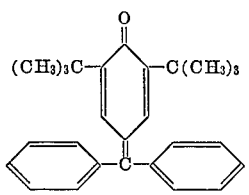

This fuchsone, apparently because of the two t-butyl substituents cannot enter into chemical reactions which are possible for fuchsones not containing these t-butyl substituents. For example, this fuchsone does not enter into either acid catalyzed reactions with nucleophiles such as water or alcohols, or base catalyzed reactions with strongly acidic CH-compounds, e.g., with malonitrile, dialkyl esters of malonic acid, acetoacetic esters, nitroalkanes, etc., which readily react with other fuchsones. In view of this, it was indeed surprising to find that 3,5-t-butylfuchsone would, under very special conditions, react with a very selected group of materials known to be very weakly acidic CH-compounds to produce, by a 1,6-addition process, 2,4,6-tri-substituted, hindered phenols which would be difficult, if not impossible, to produce by other means. In fact as far as I know, they have never been produced before. These phenols have the formula

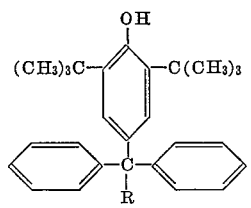

where R is selected from the group consisting of $C_{1-8}$-alkyl, benzyl, —CN, $CH_2CN$, —$CH_2$—SO—$CH_3$, —$CH_2$—$SO_2$—$CH_3$,

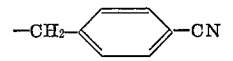

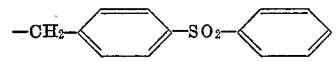

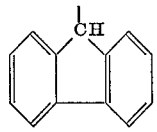

and

It will be recognized that, in the above formula, the three phenyl groups are derived from the fuchsone and the R is derived from the particular carbanion which is reacted with the fuchsone. Those phenols in the above formula, in which R is $C_{1-8}$-alkyl or benzyl, are conveniently made by first making the lithium salt of the $C_{1-8}$-alkane, or of toluene, e.g., a $C_{1-8}$-alkayl lithium or benzyl lithium which then readily reacts with 3,5-di-t-butylfuchsone to produce the lithium salt of the phenols of the above formula where R is either a $C_{1-8}$-alkyl or benzyl. The free phenol is obtained by hydrolysis of the lithium salt of the phenol with acid.

Those phenols of the above formula, where R is one of the substituents other than $C_{1-8}$-alkyl or benzyl, are conveniently made by reacting 3,5-di-t-butylfuchsone with an alkali metal cyanide (e.g., lithium, sodium, potassium, rubidium, or cesium cyanide), acetonitrile, dimethylsulfoxide, dimethylsulfone, 4-cyanotoluene, 4-phenylsulfonyltoluene or fluorene. This reaction requires the presence of a base. The alkali metal cyanides are basic enough that they do not require addition of further alkali. The other materials require the presence of an alkali metal alkoxide of a $C_{1-8}$-alkanol, e.g., a lithium, sodium, potassium, rubidium or cesium alkoxide of an alkanol having from 1 to 8 carbon atoms, for example, methanol, ethanol, propanol, isopropanol, primary, secondary and tertiary butanol, the isomeric pentanols, the isomeric hexanols, the isomeric heptanols and isomeric octanols. Because it is available commercially and very effective for this reaction, the preferred alkoxide is potassium-t-butoxide. Of the alkali metal cyanides, sodium cyanide is preferred because it is the cheapest and most readily available.

The first of the above reactions, i.e., the reaction of the alkyl or benzyl lithium with the fuchsone, is readily carried out in any liquid solvent which is inert under the reactions, for example, liquid alkanes, readily available as petroleum ethers, the liquid aryl hydrocarbons which are readily available; for example, benzene, toluene, xylene, etc., aliphatic ethers, etc. It was very surprising that in this reaction the closely related aryl lithium compounds, for example, phenyl lithium, did not react in the same fashion. Indeed, aryl lithiums react with fuchsones in an entirely different manner to produce triphenylmethanes involving a 1,2-addition to the carbonyl function of the fuchsone.

The second of the above reactions, i.e., those in the presence of the alkali metal alkoxide, require the use of a very strongly polar solvent, for example, dimethylsulfoxide or N,N-dimethylformamide, in order to cause sufficient ionization of the C-H compound so that it will react with the fuchsone. Both reactions are carried out preferably under anhydrous conditions and in an inert atmosphere to prevent side reactions of water with the alkali metal, i.e., either the lithium in the lithides or the alkali metal in the alkoxide or oxygen with the carbanion. The reaction proceeds readily without application of heat but is generally hastened by heating. Pressure has no decided effect on the reaction so, in general, the reaction if carried out at atmospheric pressure although super or sub-atmospheric pressure may be used if desired. The inert atmosphere is generally obtained by use of nitrogen, although other inert gases, such as argon, krypton, xenon, etc., may be used, if desired.

When dimethylsulfoxide is the reactant, it may be used both as the reactant and as a solvent for the reaction. When dimethylsulfoxide is used as the solvent for the other carbanion reactants, it is less acidic than any of the other reactants so that the other reactant preferentially reacts with the fuchsone.

After the reaction is completed, those reactions which contain the alkali metal alkoxide, are poured into water preferably ice water which causes the phenol product to precipitate, so it can readily be isolated by means of filtration. It may be recrystallized if desired to purity it. In those reactions where an alkyl or benzyl lithium is used as a reactant, the inert hydrocarbon solvent is conveniently evaporated, the residue treated with aqueous methanol containing sufficient mineral acid, e.g., hydrochloric acid, sulfuric acid, nitric acid, etc., to convert the lithium salt of phenol to the free phenol. The free phenol which is insoluble in methanol is removed by filtration and recrystallized if desired to purify it.

In order that those skilled in the art may readily understand my invention the following examples are given by way of illustration and not by way of limitation. In all of the examples parts and percentages are by weight, unless otherwise specified. In the elemental analyses of the products, the values given are in percent. The theoretical values for the analyses and molecular weights are given in parentheses following the determined values.

GENERAL PROCEDURE

The general procedure, used in the following examples, was to add either the alkyl lithium or alkali metal alkoxide to a solution of the fuchsone in a reaction vessel equipped with a reflux condenser and a nitrogen inlet tube which provided an inert atmosphere and stirring of the reaction mixture. In some cases the fuchsone was added to the balance of the reaction mixture. Heating, if used, was provided by a heating mantle, water bath, or oil bath which ever was most convenient.

Example 1

To a solution of 1.85 g. of 3,5-di-t-butylfuchsone in 15 ml. benzene, 5.5 ml. of a 1.6 molar solution of n-butyl lithium in hexane was added, producing a deep red reaction mixture which was refluxed for 5 minutes. The benzene solvent was evaporated under reduced pressure leaving an oily residue which was triturated with 15 ml. of aqueous methanol yielding light yellow crystals. The mixture was acidified with 2 ml. of methanol containing 0.3 ml. of concentrated hydrochloric acid. After several hours of storage in a refrigerator, filtration gave 1.4 g. of light yellow crystals of 2,6-di-t-butyl-4-($\alpha,\alpha$-diphenyl)-pentylphenol having a melting point of 95–96° C. After recrystallization by dissolving in ether and adding methanol the melting point was 97–98° C.

Example 2

Benzyl lithium was produced by reacting 2.5 ml. of a 1.6 molar solution of butyl lithium in hexane with 30 ml. of toluene containing 0.8 ml. of N,N,N′,N′-tetramethylethylenediamine. The solution was kept at room temperature under nitrogen for 10 hours. To this solution, 1.11 g. of 3,5-di-t-butylfuchsone was added producing a deep red reaction mixture. The reaction was quenched after 5 minutes standing at room temperature by the addition of 5 ml. of methanol. Evaporation of the volatile materials under reduced pressure yielded 1.38 g. of light yellow crystals of 2,6 - di-t-butyl-4-($\alpha,\alpha,\beta$-triphenyl)ethylphenol having a melting point of 163–164° C. Recrystallization by dissolving in hot chloroform and adding methanol raised the melting point to 169–170° C.

Example 3

To a suspension of 1.85 g. of 3,5-di-t-butylfuchsone in 50 ml. of dimethylsulfoxide, 0.98 g. of sodium cyanide was added. After heating at 75° C. for 15 minutes the light red colored solution was diluted with cold water producing a colorless crystalline precipitate of 2,6-di-t-butyl - 4 - ($\alpha,\alpha$-diphenyl-$\alpha$-cyano)methylphenol having a melting point of 155° C. After recrystallization from hot methanol, there was obtained 1.81 g. of this phenol. The melting point was now 156–157° C.

Example 4

To a suspension of 1.11 g. of 3,5-di-t-butylfuchsone in ml. of N,N-dimethylformamide and 0.36 ml. of acetonitrile, 0.672 g. of potassium t-butoxide was added. After heating for 3 minutes at 120° C., the reaction mixture was poured into 100 ml. of water producing a milky solution. Addition of 100 ml. of methanol to the milky solution gave 1.20 g. of a colorless crystalline precipitate of 2,6-di-t-butyl-4-($\alpha,\alpha$-diphenyl-$\beta$-cyano) - ethylphenol having a melting point of 151–152° C. Recrystallization by dissolving in hot methanol and adding water raised the melting point to 154–155° C.

Example 5

To a solution of 4.48 g. of potassium t-butoxide in 40 ml. of dimethylsulfoxide, 3.7 g. of 3,5-di-t-butylfuchsone was added. The reaction mixture was heated at 85° C. for 30 minutes producing a green solution. With vigorous stirring, 250 g. of ice and 150 ml. of water was added slowly, yielding a colorless precipitate which was removed by filtration, washed with water and recrystallized from aqueous methanol. There was obtained 4.3 g. of 2,6-di-t-butyl-4-($\alpha,\alpha$-diphenyl - $\beta$ - methylsulfonyl)ethylphenol having a melting point of 172° C. Recrystallization by dissolving in hot chloroform and addition of petroleum ether (B.P., 30–60° C.) raised the melting point to 175–176° C.

Example 6

To a solution of 1.8 g. of dimethylsulfone and 1.12 g. of potassium t-butoxide in 20 ml. of dimethylsulfoxide, 1.85 g. of 3,5-di-t-butylfuchsone was added. After 20 minutes of heating at 75–80° C. the reaction mixture which had first turned green and then deep red was slowly diluted with 150 ml. of ice water, producing a colorless precipitate which was removed by filtration, washed with water and dried at 100° C. There was obtained 2.1 g. of 2,6-di-t-butyl-4-($\alpha,\alpha$-diphenyl-$\beta$-methylsulfonyl)-ethylphenol having a melting point of 220–225° C. Recrystallization by dissolving in warm benzene and adding methanol raised the melting point to 234–235° C.

Example 7

To a solution of 1.11 g. of 3,5-di-t-butylfuchsone and 0.702 g. of 4-cyanotoluene in 20 ml. of N,N-dimethylformamide, 0.672 g. potassium t-butoxide was added. After 5 minutes of heating at 95° C., 50 ml. of ice water and 10 ml. of methanol was added to the dark reaction mixture producing a light yellow precipitate which was removed by filtration, washed with water and dried. There was obtained 1.45 g. of 2,6-di-t-butyl-4-[α,α-diphenyl - β - (4-cyanophenyl)]ethylphenol, melting point 180–181° C.

Example 8

To a solution of 1.392 g. of 4-phenylsulfonyltoluene and 1.12 g. of potassium t-butoxide in 20 ml. dimethylsulfoxide, 1.11 g. of 3,5-di-t-butylfuchsone was added. The reaction was allowed to proceed at room temperature for 4.5 hours, at which time 150 ml. ice water was added slowly which caused precipitation of a tan-colored crystalline product which was removed by filtration and washed by suspending in 50 ml. of boiling methanol. After recrystallization by dissolving in hot chloroform and addition of methanol, there was obtained a yield of 1.55 g. of 2,6-di-t-butyl-4-[α,α-diphenyl-β-(4-phenylsulfonylphenyl)] ethylphenol having a melting point of 207–208° C.

Example 9

To a solution of 1.85 g. of 3,5-di-t-butylfuchsone and 1 g. of fluorene in 50 ml. of N,N-dimethylformamide, 0.678 g. of potassium t-butoxide was added. After heating for 15 minutes at 75° C., ice was added slowly to the green reaction mixture producing an almost colorless crystalline precipitate. The reaction mixture was acidified with a little aqueous hydrochloric acid and filtered. The precipitate was dissolved in 100 ml. of boiling benzene and diluted with about 400 ml. of methanol to produce 2.2 g. of colorless crystals of 2,6-di-t-butyl - 4 - [α,α - diphenyl-α-(9-fluorenyl)]methylphenol, melting at 240–243° C. (with decomposition). Recrystallization by dissolving in hot benzene and addition of methanol did not raise the melting point.

Elemental analyses and molecular weights of the compounds prepared in the above examples are given in Table I.

TABLE I

| Example | C | H | N or S | M.W. |
|---|---|---|---|---|
| 1 | 86.60 (86.86) | 9.24 (9.41) | | 414 (428.67) |
| 2 | 88.24 (88.26) | 8.55 (8.28) | | 450 (462.68) |
| 3 | 84.64 (84.59) | 7.82 (7.86) | N, 3.69 (3.52) | 392 (397.57) |
| 4 | 84.62 (84.63) | 7.88 (8.08) | N, 3.13 (3.40) | 411 (411.59) |
| 5 | 77.55 (77.63) | 8.17 (8.09) | S, 6.84 (7.13) | 451 (448.68) |
| 6 | 75.14 (74.96) | 8.08 (7.81) | S, 6.90 (6.90) | 468 (464.68) |
| 7 | 86.15 (86.19) | 7.30 (7.64) | N, 3.00 (2.87) | 490 (483.66) |
| 8 | 79.42 (79.70) | 6.98 (7.02) | S, 5.19 (5.32) | 606 (602.85) |
| 9 | 89.56 (89.51) | 7.53 (7.51) | | 523 (536.77) |

In the same manner as in disclosed Example 3, other alkali metal cyanides, for example, lithium cyanide, potassium cyanide, ribidium cyanide, cesium cyanide, etc., may be used in place of the sodium cyanide. Likewise, in place of the potassium t-butoxide used in Examples 3–9 other alkali metals as well as other alkanols may be used as the source of alkali metal alkoxide as disclosed previously. In Example 1, the n-butyl lithium may be replaced with any $C_{1-8}$-alkyl lithium to produce substituents on the carbon atom in the 4-position of the phenol corresponding to the particular alkyl lithium used.

The hindered phenols of this invention have a wide variety of uses. For example, they may be dissolved in petroleum products, e.g., gasoline, lubricating oils, fuel oils, etc., as antioxidants. They may likewise be dissolved in polymerizable monomers to serve as polymerization inhibitors or as disclosed previously, they may be oxidized to produce free radicals useful in free radical reactions. Likewise, those phenols having a reactive group, for example, the cyano group may be further modified, for example, by hydrolysis of the cyano group to the amide group or to the carboxyl group to produce a reactive position which permits incorporation of these materials in polyamides, polyimides, polyesters, including polycarbonates, as chain terminating agents which thereby incorporate a stabilizing group into the polymer molecule. Other uses for the hindered phenols of this invention will be readily recognized by those skilled in the art.

Obviously other modifications and variations of the present invention are possible in light of the above teachings. Therefore, it is to be understood that changes may be made in the particular embodiments of the invention described which are within the full intended scope of the invention and as defined by the appended claims.

What I claim as new and desire to secure by Letters Patent of the United States is:

1. Phenols having the formula

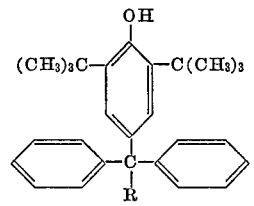

where R is selected from the group consisting of $C_{1-8}$-alkyl, benzyl, —CN, —CH$_2$CN, —CH$_2$—SO—CH$_3$, —CH$_2$—SO$_2$—CH$_3$

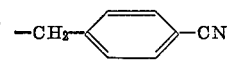

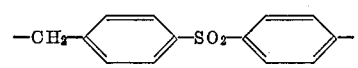

and

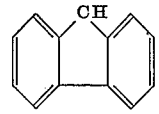

2. The compound of claim 1 where R is —CN.
3. The compound of claim 1 where R is —CH$_2$CN.
4. The compound of claim 1 where R is

—CH$_2$—SO$_2$—CH$_3$

5. The compound of claim 1 where R is

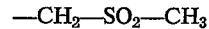

6. The compound of claim 1 where R is

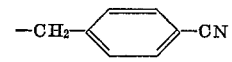

7. The compound of claim 1 where R is —C$_4$H$_9$.
8. The compound of claim 1 where R is

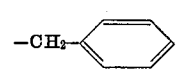

9. The process of producing the compounds of claim 1 which comprises reacting 3,5-di-t-butylfuchsone with a compound selected from the group consisting of (A) an alkali metal cyanide, acetonitrile, dimethyl sulfoxide, dimethyl sulfone, 4-cyanotoluene, 4-phenylsulfonyltoluene, fluorene and (B) R'—Li where R' is $C_{1-8}$-alkyl and benzyl, the reaction of the 3,5-di-t-butylfuchsone and the compounds of (A) being carried out in a homogeneous solution in a solvent selected from the group consisting of N,N-dimethylformamide and dimethylsulfoxide in which, except when the compound of (A) is an alkali metal cyanide, there is dissolved an alkali metal $C_{1-8}$-alkoxide and the reaction of the 3,5-di-t-butylfuchsone and the compounds of (B) being carried out in an inert liquid solvent for the reactants.

10. The process of producing the compounds of claim 1 where R is selected from the group consisting of —CN, —CH$_2$CN, —CH$_2$—SO—CH$_3$, —CH$_2$—SO$_2$—CH$_3$,

—CH$_2$—C$_6$H$_4$—CN,  —CH$_2$—C$_6$H$_4$—SO$_2$—C$_6$H$_5$ and

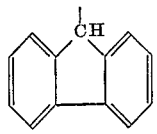

which comprises reacting 3,5-di-t-butylfuchsone with a compound selected from the group consisting of an alkali metal cyanide, acetonitrile, dimethyl sulfoxide, dimethyl sulfone, 4-cyanotoluene, 4-phenylsulfonyltoluene and fluorene said reaction being carried out in a homogeneous solution in a solvent selected from the group consisting of N,N-dimethylformamide and dimethylsulfoxide in which, except when the compound reacted with the said fuchsone is an alkali metal cyanide, there is dissolved an alkali metal C$_{1-8}$-alkoxide.

11. The process of claim 9 wherein the alkali metal C$_{1-8}$-alkoxide is potassium t-butoxide.

12. The process of producing the compounds of claim 1 where R is selected from the group consisting of C$_{1-8}$-alkyl and benzyl which comprises reacting 3,5-di-t-butyl-fuchsone with an alkyl lithium selected from the group consisting of C$_{1-8}$-alkyl lithium and benzyl lithium in a homogeneous solution in an inert liquid solvent.

References Cited
UNITED STATES PATENTS 3,297,726   1/1967   Zecher et al. -------- 260—395

LORRAINE A. WEINBERGER, Primary Examiner

L. A. THAXTON, Assistant Examiner